United States Patent Office 3,080,040
Patented Mar. 5, 1963

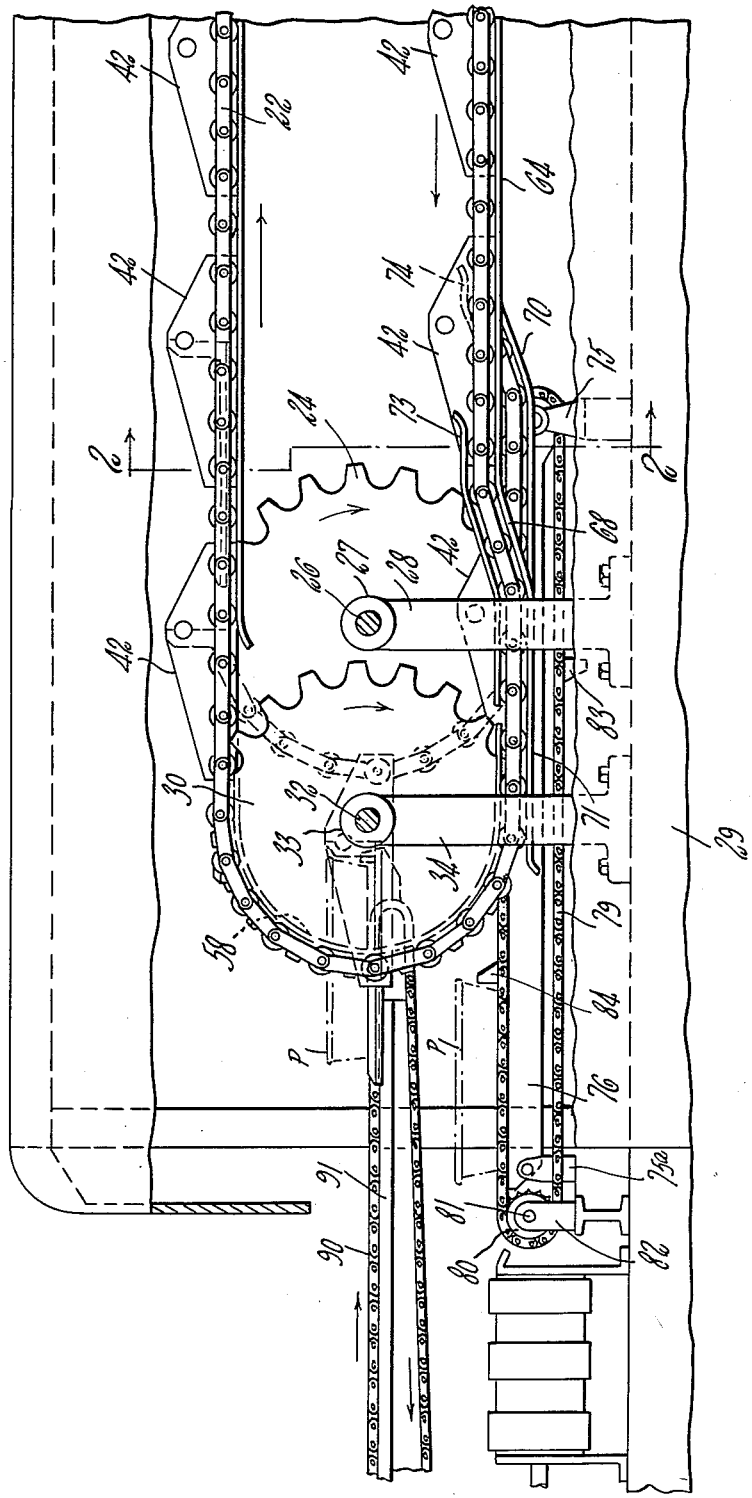

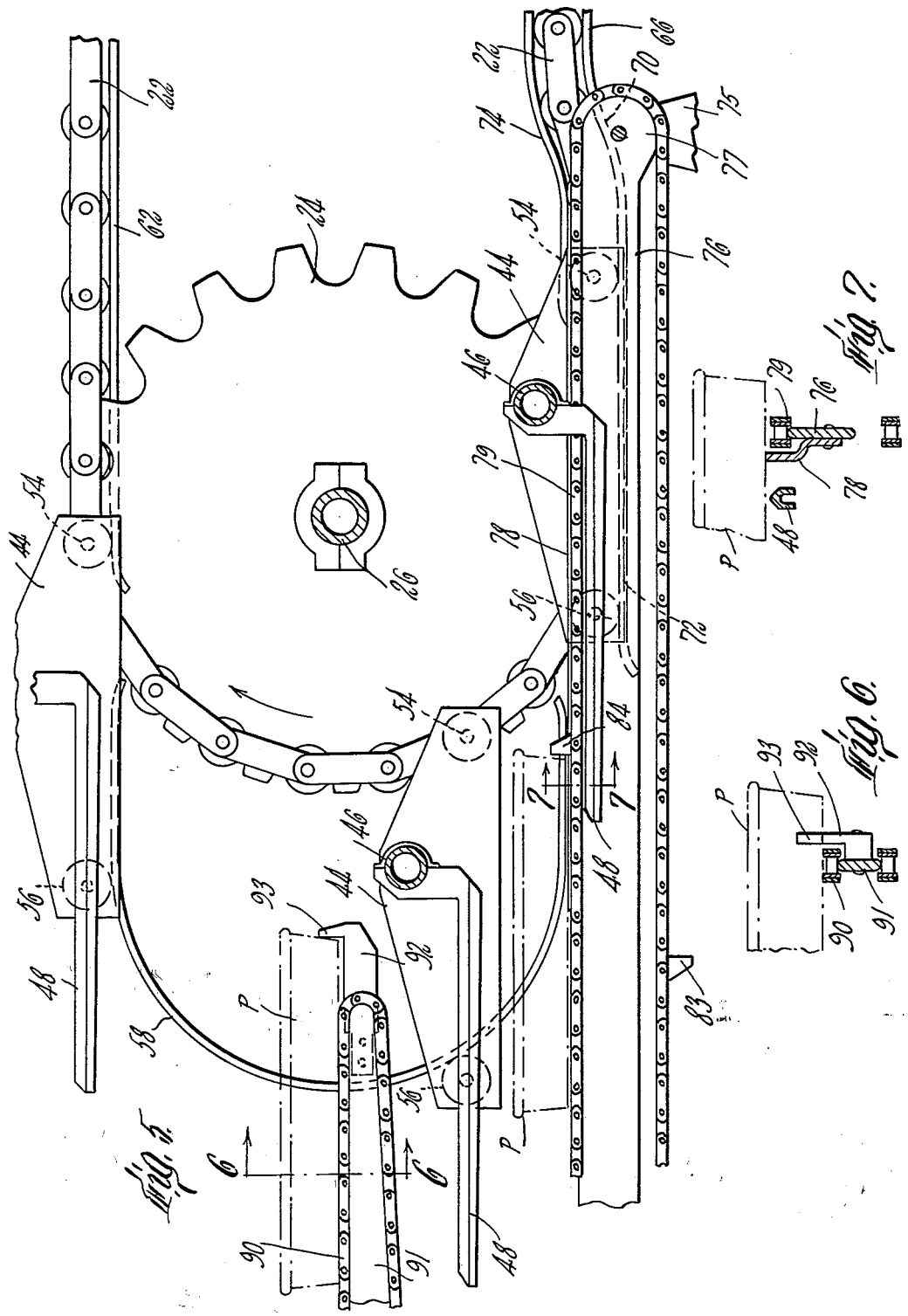

3,080,040
BAKING OVEN SYSTEM
Roger S. Estabrooks, Billerica, and Charles G. Gibbons, Wilmington, Mass., assignors to J. W. Greer Company, Wilmington, Mass., a corporation of Massachusetts
Filed May 9, 1960, Ser. No. 27,893
11 Claims. (Cl. 198—23)

This invention relates to baking oven systems and more particularly to conveyor systems and methods, including loading and unloading mechanisms, useful in connection with said ovens for loading bakery goods such as panned bread onto oven conveyors and removing the same therefrom.

The conveyors in such ovens are usually comprised of a pair of endless chains supported on opposed sets of sprocket wheels rotating on horizontal axes. The chains of such conveyors invert as they pass around the sprocket wheels and accordingly if one wishes to utilize both lower and upper traverses as article carrying traverses, provision must be made to avoid inversion of the article holders or trays as they are carried around the sprockets by the chains and to hold them level to prevent inadvertent loss of articles being carried.

While automatic loaders and unloaders for such baking ovens have heretofore been proposed, all of them to my knowledge involve serious mechanical and control complications, at least in those cases where the oven chain conveyors are operated continuously and particularly where an attempt is made to do loading and horizontal unloading in a direction longitudinally of the machine at one end of the oven.

One such proposal involves horizontal push-on and push-off motions of the articles, including an individual push-off ejector in each tray and moving goods-receiving and goods-delivering platforms which have to be delicately synchronized with the movement of the trays to allow the platforms to remain in horizontally abutting relation long enough for the push-on or push-off to be accomplished. Such an unloading device is described in United States Patent No. 2,847,132. In commercial forms such ovens have very complex electrical and mechanical interlock systems.

According to the present invention there is provided an oven conveyor which has satisfactory means for maintaining the conveyor trays level at all times, while also providing much simplified automatic unloading and loading mechanism which operates at the end of the oven without requiring an ejector for each tray, and which, in accordance with the method of this invention, depends upon a vertical component of motion of the trays to aid in effecting discharge and loading of the articles, all without stoppage of the oven conveyor.

To this end the conveyor includes novel trays, which, because of their design, are more accurately described as tray or pan holders, means for stabilizing the holders and a novel path of chain travel, all for the purpose of permitting a simple drop-off and pick-up of articles such as bread without interruption in the bodily motion of the holders under positive stabilized control.

Because the pick-up of the articles at the loading station depends upon a vertical component of motion, the lift is gentle in action which is desirable with unbaked dough. If rapidly injected horizontally and abruptly stopped, detrimental effects upon the unbaked dough can result. The injecting mechanism at the loading station of the present apparatus may operate very slowly, comparable to previous such operations.

In the accompanying drawings:

FIG. 1 is a side elevational view of a conveyor of the invention with its associated discharging and loading mechanism;

FIG. 5 is an enlarged cross-sectional view taken along the line 5—5 of FIG. 3;

FIG. 6 is a cross-sectional detail view taken along the line 6—6 of FIG. 5;

FIG. 7 is a cross-sectional detail view taken along the line 7—7 of FIG. 5; and

Figure 3:
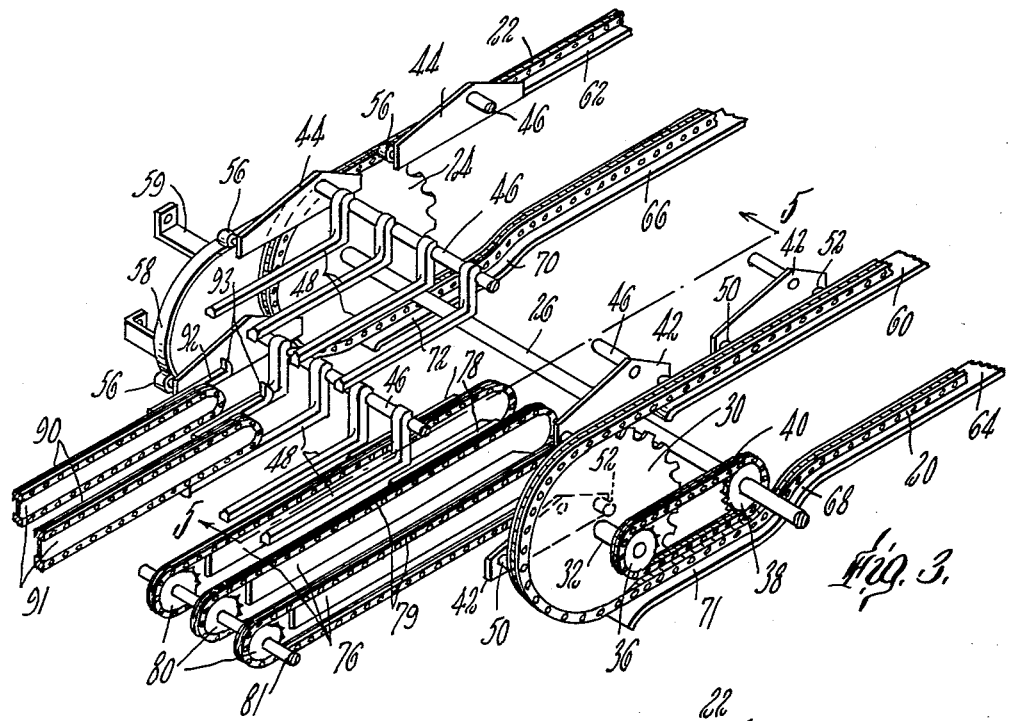
FIG. 3 is a perspective view of certain of the parts, omitting others for the purposes of clarity.

Referring to FIGS. 1 and 3, as is normal in an oven conveyor, there are two endless chains 20 and 22 mounted for movement in closed paths in spaced vertical planes. Sprocket 24 for chain 22 is mounted for rotation with a transverse shaft 26 carried on bearings 27 on standards 28 (FIG. 1) on the frame 29 of the apparatus. Near chain sprocket 30, instead of, as is usual, being mounted on the same shaft 26, is mounted on an offset stub 32 carried on bearing 33 on standard 34. As shown in FIG. 3 shafts 32 and 26 carry small sprockets 36 and 38 respectively, which are connected by an endless chain 40 to maintain sprockets 24 and 30 in uniform rotation.

Figures 2, 4, 8:
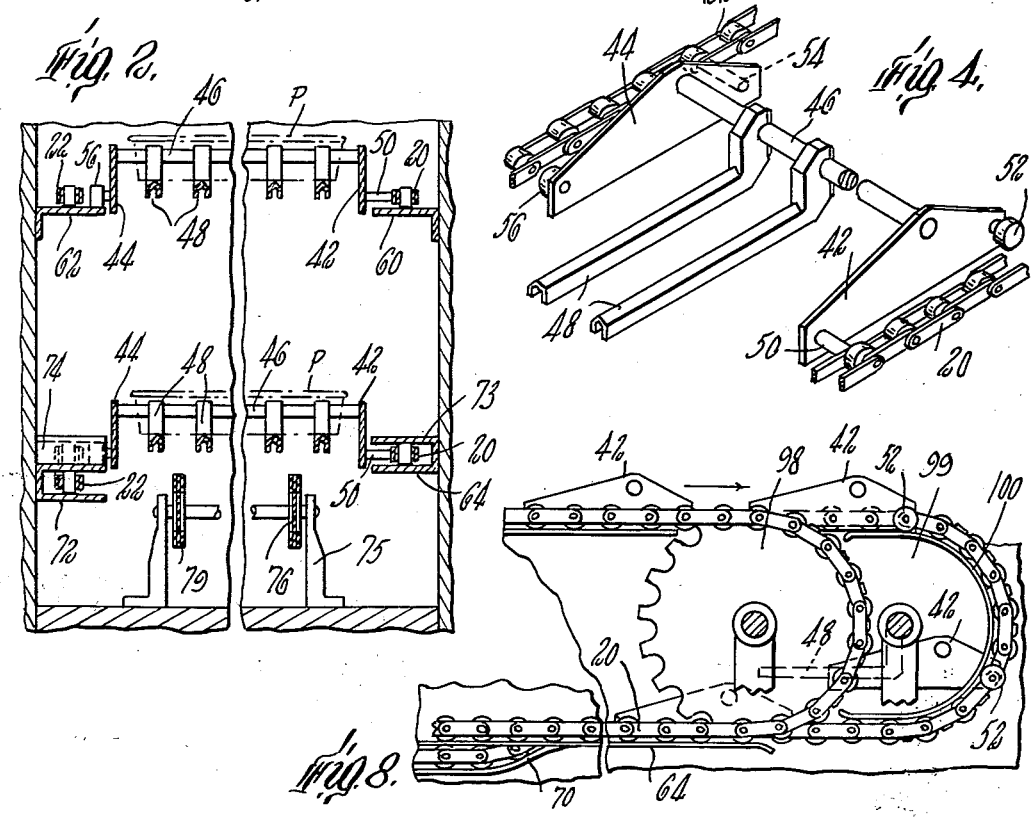
FIG. 2 is a cross-sectional view thereof, taken along the line 2—2 of FIG. 1, broken away to indicate extent.
FIG. 4 is a perspective view (enlarged and broken away) showing details of certain of the parts shown in FIG. 3.
FIG. 8 is an elevational view, partly in section, of the other end of the apparatus.

The offset relation of the sprockets 24 and 30 permits a stabilized suspension of the tray holders. As shown in FIG. 4 each tray holder carriage comprises a rigid unit including a pair of spaced plates 42 and 44 connected by a transverse bar or tie rod 46 rigidly supporting horizontally extending laterally spaced fingers or tines 48, collectively forming a fork lift for each carriage, the level supporting surface of which is disposed wholly on one side of the tie rod 46.

In order to stabilize such an unbalanced carriage, the plates 42 and 44 are not connected identically to the adjacent chains 20 and 22. Thus plate 42 carries an outwardly extending pin 50 which pivotally engages adjacent links of chain 20 on one side of tie rod 46 while opposite plate 44 carries its chain engaging pin 54 on the opposite side of tie rod 46; and pins 50 and 54 are spaced apart a distance equivalent to the distance between shafts 26 and 32 so that as pin 50 passes around sprocket 30, pin 54 will be passing around sprocket 24, both at the same level. The intervening structure, including the fork 48 will thus always be maintained parallel to the horizontal plane passing through the axes of the pins 50 and 54. However, in order to help relieve the strain imposed by the torque inherent in the unbalanced suspension, during lift, plate 44 carries an idler roll 56 in alinement with pin 50 and this roller 56 engages a cam surface 58 mounted on brackets 59 fixed to the frame of the machine as the carriage moves through the last quadrant of its upward motion.

Plate 42 bears a similar idler roll 52 in alinement with opposite pin 54 for engagement with a cam similar to 58 provided at the other end of the machine on the near side.

During the upper outgoing horizontal traverses of the carriages the chains 20 and 22 are supported by the chain rolls engaging with upper horizontally extending stationary rails 60 and 62 respectively, which commence just short of the sprocket wheels 30 and 24 respectively, and are designed to support the chains at a level with the tops of the sprocket wheels. On the lower ingoing traverse, however, the chains are initially supported at a level above the bottoms of sprockets 24 and 32 by rails 64 and 66 respectively, but each of these rails bends downwardly at 68 and 70 respectively, in offset relation at equal distances in advance of the sprockets and then levels off at 71 and 72 respectively, at the level of the bottoms of the sprockets, thus forming a split-level bottom traverse. Above each of these bends is an upper chain-retaining rail 73 and 74, respectively (FIG. 1).

By this arrangement pin 50 on the near side passes down incline 68 at the same time that pin 54 on the opposite side passes down incline 70 (to maintain the carriages level).

During this inclined drop of the forks, they pass downwardly through an unloading grid. The unloading mechanism includes a series of parallel conveyor chains, two of which are shown in FIG. 3, and whose operation is more clearly understood by reference to FIG. 5. Rigidly supported as between pairs of brackets 75 and 75a are a series of chain-supporting stationary rails 76 having semicircular inner ends 77 alined with the beginning of the inclination on rail 66. As shown in FIG. 7, each rail 76 has a stationary offset rail 78 extending upwardly therefrom above the level of an endless chain 79 which rides on rail 76 and is driven by a sprocket 80 mounted on a drive shaft 81 supported in bearings 82 mounted on frame 29. The rails 78 thus form cumulatively a stationary grid intercalated with the paths of travel of the forks 48.

Each chain 79 carries two lugs 83 and 84, and is operated at a speed substantially greater than the speed of chains 20 and 22. As forks 48 descend from their level when the chains 20 and 22 are supported on rails 64 and 66 to their lower level when the chains are supported on the rail portions 71 and 72, their tines pass downwardly through and below the level of the stationary grid formed by rails 78, thus depositing onto the grid 78 a pan P or the like carried by the tines. The pan remains momentarily on the grid 78 until an unloading conveyor chain lug 83 or 84 fetches up against the rear of the pan and wipes it off the stationary grid 78 onto the chains 79, from whence it may be transferred to another conveyor.

This operation is so timed that after the pan has been deposited on stationary grid 78, the pan will be wiped off the grid and outside of the path of the tines of the fork 48 before the forks rise back upwardly through the grid. As shown in the drawings this interval is equivalent to that required to move chain 22 between about 8 and 9 link lengths, i.e., from a pin 50 position partly advanced down the incline 68 back up to the same level as pin 50 moves upwardly around sprocket 30.

After passing back upwardly through grid 78, the fork 48 passes upwardly between input chain conveyors 90 running over a series of stationary rails 91, similar to rails 76. Each rail 91 at its inner end has a stationary extension piece 92 (FIGS. 5 and 6) terminating in an upstanding stop 93 forming collectively a loading platform. Pans P to be loaded are carried into the machine by conveyors 90 against the stops 93 where they remain until picked up by rising forks 48. Chains 90 may be continuously operated and scrape across the bottoms of the pans after the pans engage the stops 93. A timing device may be incorporated to feed pans P onto chains 90 at spaced intervals corresponding to the interval between the passage of forks of successive carriages, but the speed of conveyors 90 may be relatively slow so that the pans do not bang against the stops 93.

There is thus provided an apparatus all of whose conveyors may have continuous motion yet incorporating end loading and unloading plus controlled horizontally level carriage of the articles to be conveyed at all times.

As shown, both the loading and unloading operations take place at one end of the apparatus, with the trays being fed to a fixed stationary position against loading platform stops 93 in an ingoing direction parallel to a vertical plane passing through the top and bottom traverses of the tray holder carriages and being ejected off of the stationary unloading platform formed by rails 78 in an opposite direction also parallel to such a vertical plane.

Because rails 64 and 60, and 66 and 62 are spaced at a distance apart less than the uniform diameter of sprockets 24 and 30, it will be understood that, if sprockets of the same diameter are supplied at the other end of the conveyor, upward inclines will have to be incorporated some place on the lower traverses; otherwise the sprockets 98 and 99 at the other end will need be of smaller radius and on a higher axis level than that of shafts 26 and 32, as illustrated in FIG. 8, and the cam surface 100 (corresponding to the cam surface 58 at the other end of the apparatus) is positioned to engage the idler rollers 52 on the near side of the machine instead of the idler rollers 56 on the far side of the machine.

What is claimed is:

1. In an oven conveyor, a series of carriages mounted for travel in succession around an endless path including a bottom horizontal traverse, each of said carriages having a transverse bar and forks having parallel tines protruding downwardly from said bar and forwardly in the direction of travel of the carriage along said horizontal traverse and collectively providing a horizontal supporting surface disposed at a level below said transverse bar for carrying an article supported spanningly on said supporting surface, a series of individually spaced members lying in parallel staggered relation with the paths of travel of said tines and extending away from the out-going end of said bottom horizontal traverse and collectively forming unloading means for said articles, said members including ejecting means in the form of lugs movable along fixed paths, including paths extending above and intercalated with said tine paths but below the level of the paths of travel of said transverse carriage bars and means for moving said lugs along said lug paths in the direction of movement of said carriages at a speed greater than the speed of said carriages after the trailing ends of the horizontal article supporting portions of the tines of successive carriages have reached the inside ends of said lug paths and are thereby in intercalated relation with said lug paths to cause said lugs to engage the trailing walls of said articles and eject said articles out of said endless path before said carriages reach the out-going end of said bottom traverse.

2. In a conveyor, a series of carriages mounted for travel in succession around an endless path having superimposed generally horizontal traverses, each of said carriages having forks protruding in the direction of travel of said carriages along one of said traverses and collectively forming a supporting surface for carrying articles spanningly supported thereon, means retaining said forks substantially level throughout said endless path of travel, a series of individually spaced horizontally extending stationary parallel rails disposed in staggered relation with the paths of travel of the individual tines of said forks and collectively forming an unloading grid, and means for passing each supporting surface during a portion of its travel between opposite ends of said endless path downwardly in intercalated relation through said unloading grid to deposit articles carried on said surface onto said unloading grid, along said grid below its top level and then back up through said grid, and ejection means for moving articles deposited on said unloading grid from the supporting surface of each carriage during said intercalated downward motion of said grid off said grid before said surface rises back up to the top level of said grid.

3. A conveyor as claimed in claim 2 wherein the ejection means moves said articles off said unloading grid in the same direction as the direction of their movement on said forks along the endless path just prior to their deposit upon said grid.

4. A conveyor as claimed in claim 2 wherein the ejection means includes a series of endless chains bearing lugs which engage articles deposited on the unloading grid and move them off said grid.

5. A conveyor as claimed in claim 2 wherein said ejection means includes an endless conveyor also intercalated with the paths of fork travel, a lug on said conveyor having a path of travel across said grid above the top level of said grid and in a direction longitudinally out of said machine, and means for moving said lug across said grid while the supporting surface of each carriage is travelling below the top level of said grid.

6. A conveyor as claimed in claim 5 wherein both the carriage and ejection conveyors move continuously.

7. In a conveyor, a series of carriages mounted for travel in succession around an endless path having an upper horizontal traverse and a lower split-level horizontal traverse, each of said carriages having forks protruding in the direction of travel of said carriages along said lower traverses and collectively forming a supporting surface for carrying articles spanningly supported thereon, means retaining said forks substantially level throughout said endless path of travel, a series of individually spaced horizontally extending parallel members between the levels of the split-level bottom traverse, with said members disposed in staggered relation with the paths of travel of the individual tines of said forks and collectively forming unloading means along said split-level traverse, and means for passing each supporting surface during the portion of its travel from one level to the lower level along said split-level traverse downwardly in intercalated relation through said unloading means at a first point along said split-level traverse to deposit articles carried on said surface onto said unloading means, along said unloading means below its top level and then back up through said unloading means at a second point along said split-level traverse spaced from said first point, and ejection means for moving articles, deposited on said unloading means from the supporting surface of each carriage, beyond said second point in the same direction as the direction of their movement on said forks along said lower split-level traverse before said surface rises back up to the top level of said unloading means at said second point.

8. A conveyor as claimed in claim 7 wherein the parallel members comprise a stationary grid for receiving articles from said forks.

9. A conveyor as claimed in claim 8 wherein said ejection means includes an endless conveyor also intercalated with the paths of fork travel, a lug on said conveyor having a path of travel across said grid above the top level of said grid and in a direction longitudinally out of said machine, and means for moving said lug across said grid while the supporting surface of each carriage is travelling below the top level of said grid.

10. A conveyor as claimed in claim 9 wherein both the carriage and ejection conveyor move continuously with said ejection conveyor moving at a higher speed than said carriages.

11. In a conveyor, a series of carriages mounted for travel in succession around an endless path, each of said carriages having forks protruding in the direction of travel of said carriages along one of said traverses and collectively forming a supporting surface for carrying articles spanningly supported thereon, means retaining said forks substantially level throughout said endless path of travel, a series of individually spaced horizontally extending stationary parallel rails disposed in staggered relation with the paths of travel of the individual tines of said forks along said traverse and collectively forming an unloading grid, means for passing each supporting surface downwardly in intercalated relation through said unloading grid to deposit articles carried on said surface onto said unloading grid, ejection means for moving articles thus deposited on said unloading grid off said grid in the direction of travel of said carriages along said one traverse and means for moving each supporting surface after it has unloaded an article onto said grid, along said grid below the top level of said grid while said ejection means is moving said article off said grid, and for then moving the supporting surface back up through said grid and upwardly across the path of ejection of said article after it has been ejected by said ejection means.

References Cited in the file of this patent
UNITED STATES PATENTS

| | | |
|---|---|---|
| 799,993 | Levalley | Sept. 19, 1905 |
| 1,458,881 | Gromer | June 12, 1923 |
| 1,794,331 | Klyver et al. | Feb. 24, 1931 |
| 2,634,869 | Hicks | Apr. 14, 1953 |
| 2,874,650 | Royer | Feb. 24, 1959 |